F. C. HOLLY.
PULVERIZER AND DISTRIBUTER FOR PROPORTIONING AND FEEDING GRANULATED MATERIAL.
APPLICATION FILED SEPT. 7, 1915.
1,190,168.
Patented July 4, 1916.
3 SHEETS—SHEET 1.
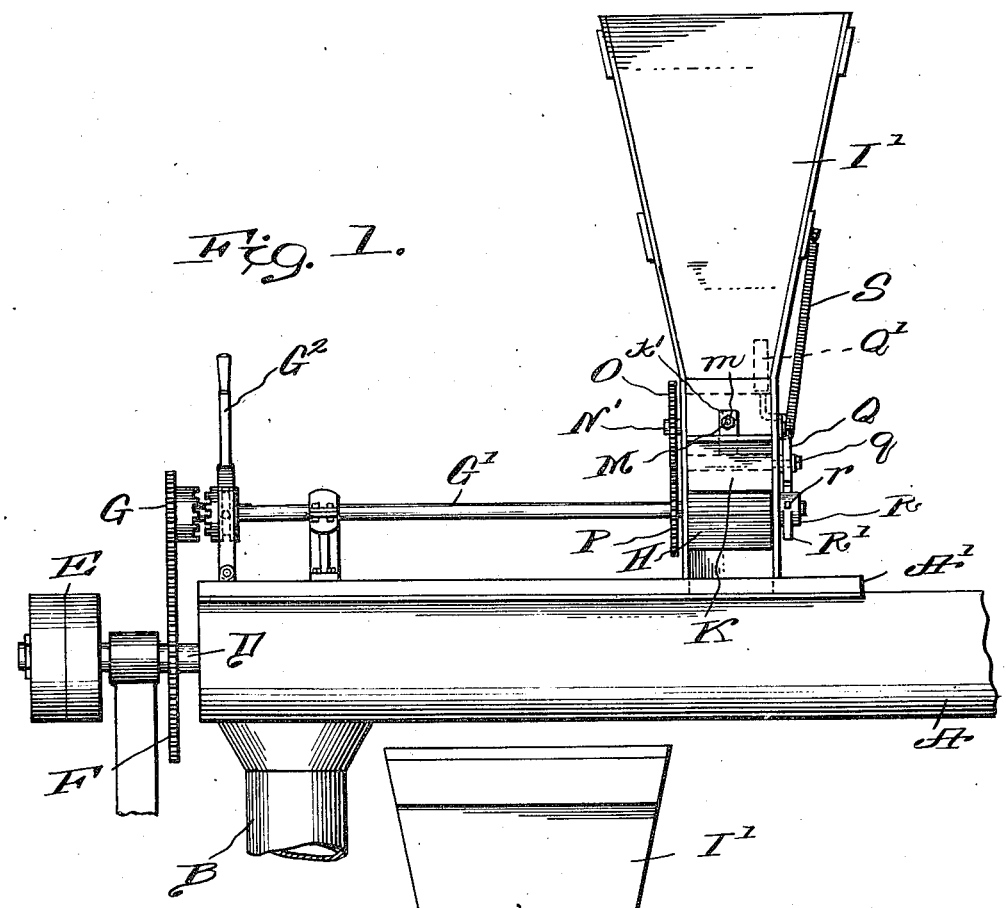

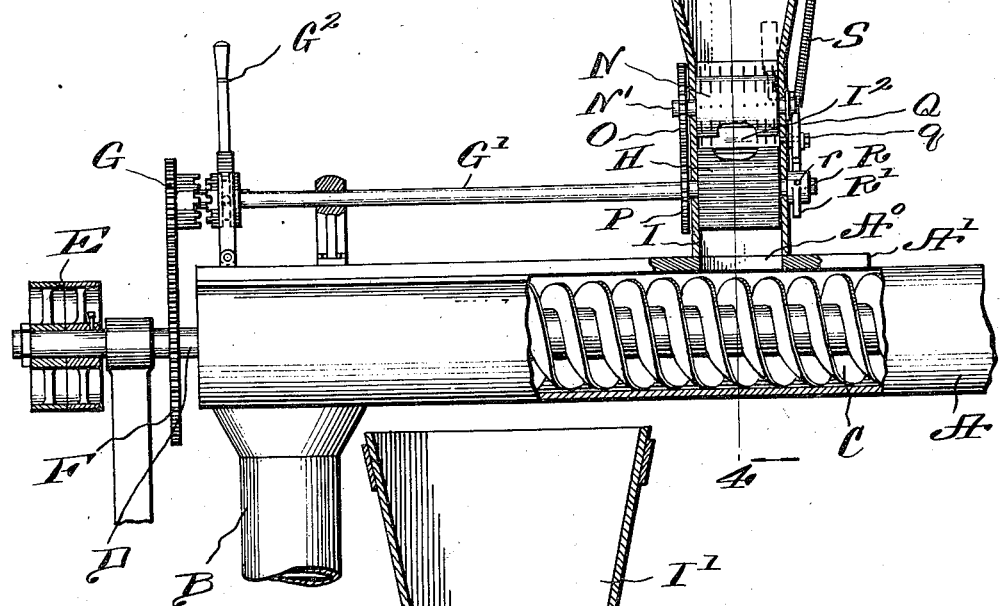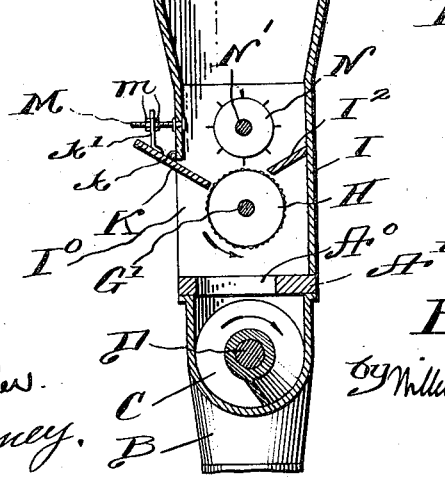

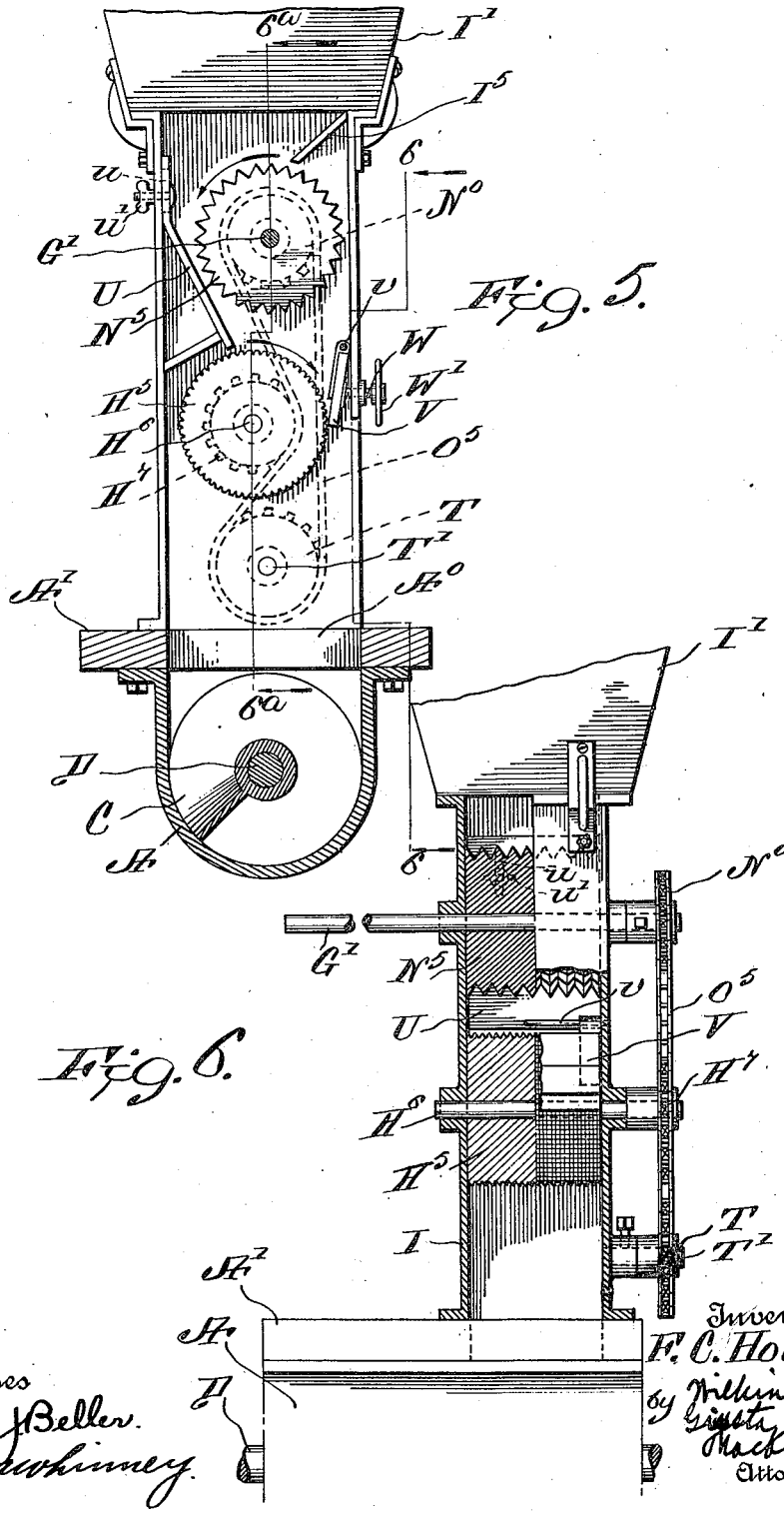

UNITED STATES PATENT OFFICE.

FORREST C. HOLLY, OF MEMPHIS, TENNESSEE.

PULVERIZER AND DISTRIBUTER FOR PROPORTIONING AND FEEDING GRANULATED MATERIAL.

1,190,168.  Specification of Letters Patent.  Patented July 4, 1916.

Application filed September 7, 1915. Serial No. 49,361.

*To all whom it may concern:*

Be it known that I, FORREST C. HOLLY, a citizen of the United States, residing at Memphis, in the county of Shelby and State of Tennessee, have invented certain new and useful Improvements in Pulverizers and Distributers for Proportioning and Feeding Granulated Material; and I do hereby declare the following to be a full, clear, and exact description of the invention, such as will enable others skilled in the art to which it appertains to make and use the same.

My invention relates to improvements in apparatus for pulverizing and distributing powdered materials in graded or predetermined quantities, and is more especially intended to supply powdered salt, with or without other ingredients, to cotton seed or other seeds or grain for the purpose of sterilizing and preserving the same, as described in the United States patent to E. R. Barrow, No. 1119672, granted December 1, 1914, and entitled Process for sterilizing and preserving cotton seed. According to this process, it is especially desirable to treat the seed or grain uniformly with the preservative, and to intimately mix the same therewith, which result is accomplished by the apparatus herein described.

Reference is had to the accompanying drawings, in which the same parts are indicated by the same letters or numerals throughout the several views.

Figure 1 is a side elevation showing the apparatus mounted on an ordinary screw conveyer; Fig. 2 is an end view of the apparatus as seen from the left of Fig. 1, the screw conveyer being shown in section, and the parts being shown on a larger scale than in Fig. 1; Fig. 3 is a similar view to Fig. 1, the distributing apparatus being shown in central vertical section, and parts being shown in elevation and parts being broken away; Fig. 4 shows a section along the line 4—4 of Fig. 3, and looking in the direction of the arrows; the parts being shown on the same scale as in Fig. 2; Fig. 5 shows another form of apparatus for pulverizing and feeding the material to the conveyer, one side of the casing below the hopper being removed to show the interior thereof; and Fig. 6 is a compound sectional view of the device shown in Fig. 5, the right side of Fig. 6 showing a section along the line 6—6 of Fig. 5, and the left side of Fig. 6 showing a section along the broken line $6^a$—$6^a$ of Fig. 5, in both cases looking in the direction of the arrows.

Referring first to Figs. 1 to 4; A represents the casing of an ordinary screw conveyer for conveying the cotton seed from the source of supply, not shown, to the distributing point, not shown, from which latter it is delivered to any convenient feed chute B. This casing is provided with a top A', which is open as at $A^0$ above the screw C. This screw C is mounted on the shaft D and is turned from any suitable source of power, as by means of the fast and loose pulleys E. The screw conveyer not being part of my invention will not be further described. Mounted on the shaft D is a gear wheel F, meshing in the pinion G on the shaft G', which shaft carries the feed roller H journaled in the box I, beneath the hopper I'. This feed roller H may be preferably made of wood with a rough-turned surface, as salt is not apt to adhere to or corrode the wood, and the surface of this roller may be readily cleaned if desired; but, if desired, the roller may be made of any suitable metal, roughened or corrugated on the surface. $G^2$ represents a clutch lever by which the pinion G may be thrown into and out of engagement with the gear wheel D when desired. Mounted in the box I is a stationary cant-board $I^2$, serving to deflect the pulverized material to the top of the roller H, and opposite this cant-board is a feed control gate K, hinged above the opening $I^0$ in the side of the box, as shown in Fig. 4, and provided with an arm $k'$ held at the desired position between the adjusting nuts $m$ on the screw M, all as shown in Fig. 4. Mounted above the feed roller H is a spiked roller N carried by the shaft N', which shaft carries a gear wheel O meshing with the gear wheel P on the shaft G'; and thus the rotation of this shaft G' rotates both of the rollers H and N, the latter breaking up the material and the former feeding the same through the opening between it and the gate K, and permitting it to drop through the opening $A^0$ into the screw conveyer where it is thoroughly mingled with the cotton seed incident to the operation of the conveyer. To prevent the pulverized material from caking on the sides of the hopper I', I provide a shaker operated by the rotation of the shaft G', which is shown in Figs. 1 and 2, in which Q represents a lever pivoted at $q$ to the side of the box I, and having a long arm $q'$ carrying the weight Q', which arm is normally drawn upward by the spring S tending to cause the weight Q to strike the wear plate $I^3$ on the side of the hopper, as shown in Fig. 2. The other arm $q^2$ of this lever Q is alternately pressed upward and released by the toes R' carried by the collar R, secured to the shaft G' by means of the set screw $r$. It will be seen that as the shaft G' revolves, these toes R' will alternately lift and release the arm $q^2$, drawing back the weight Q against the action of the spring S, and then releasing the same, permitting this weight to strike a blow against the wear plate $I^3$, thus vibrating the hopper I' and, in a large measure, preventing the powdered material from sticking to the inner walls thereof. By adjusting the position of the feed gate K, the amount of the powdered material fed from the hopper I', to the screw conveyer may be varied at will, and by having the feed roller H driven from the conveyer shaft D, the speed of this roller H will always vary directly with the speed of the conveyer, so that when the conveyer is being driven slowly the feed roller H will also be driven slowly. Thus the quantity of the powdered material supplied to the conveyer will be uniform so long as the position of the feed gate K is not changed. If it is desired to increase the feed, open the feed gate to the desired position, and vice versa, if it is desired to decrease the feed of the powdered material to the cotton seed.

The operation of the device shown in Figs. 1-4 is as follows:—The ground-up material is fed into the hopper I', and the bottom portion thereof is kept stirred up by the spiked pulverizing roller N, which projects into the throat of the hopper formed by the cant-board $I^2$ and the feed control gate K; the amount of powdered material to be fed to the conveyer being determined by the position of this feed control gate, which is regulated by the adjusting nuts $m$. By having the roller H of wood, the salt is not apt to stick to same, or corrode same, but, as before stated, the feeding roller may be made of any suitable metal having the surface roughened or corrugated, as desired. The material passing between the feed roller and the gate K falls in through the opening $A^0$ in the top of the conveyer casing, and falls on top of the cotton seed in the screw conveyer, and the seed, with the pulverized material, is forced forward under the action of the screw conveyer and intimately mixed, the salt and other ingredients of the powdered composition adhering to the surface of the seed, and the product is delivered through the chute or pipe B to be subsequently treated as described in the patent to E. R. Barrow aforesaid.

Referring to the form of device shown in Figs. 5 and 6, the operation is essentially the same as already described, but there are modifications in the parts contained in the casing I beneath the hopper I'. In this form of device, the shaft G' is connected to the pulverizing roll $N^5$ instead of to the feed roll, and this shaft G' is provided with a sprocket wheel $N^0$ engaging the sprocket chain $O^5$ which passes over the sprocket wheel $H^7$ in the direction shown in Fig. 6, so as to give the proper direction of rotation to the shaft $H^6$ of the feed roller $H^5$. This sprocket chain then passes over an idle sprocket wheel T on a stub shaft T'. This feed roller $H^5$ is preferably made of hard wood, grooved and fluted, as shown, and the pulverizing roll $N^5$ is preferably made of cast iron, also grooved and fluted as shown. A cant-board $I^5$ is provided beneath the hopper I' to direct the contents of the hopper onto the pulverizing roll, and an adjustable cant-board U is mounted on the opposite side of the pulverizing roll and partly below the same, and directs the pulverized material to the feed roller $H^5$. This cant-board is preferably in the form of a metal plate, slotted as at $u$, and adjustably held in place by means of the bolts and butterfly nuts $u'$. By raising or lowering this adjustable cant-board the pulverizing or crushing of the materials is secured. A feed control gate V is provided, preferably of hard wood having its lower end fitting snugly against the corrugated face of the feed roll, and hinged at its upper end as at $v$. This gate is held in the desired position relative to the feed roll by means of the screw W and hand wheel W'. The operation of this form of the device is substantially the same as that already described, except that a metal pulverizing roll is used instead of a spiked roll, and the surface of the feed roll is also slightly changed, as also the feed gate, but the claims hereinafter drawn are intended to cover both forms of the device.

While the apparatus is especially intended for use in the distribution of dry finely divided salt in connection with the Barrow process aforesaid, it will be obvious that it may be applied to pulverizing and distributing powdered materials in graded or predetermined quantities, and I intend to claim the device broadly for all the uses to which it is applicable.

It will be obvious that various other modifications might be made in the herein described apparatus, and in the construction, combination and arrangement of parts which could be used without departing from the spirit of my invention.

Having thus described my invention what

I claim and desire to secure by Letters Patent of the United States is:—

1. Means for pulverizing and distributing fine granular material, comprising a hopper, a box mounted below said hopper, and provided with a cant-board and an adjustable feed gate, a feed roller mounted beneath said cant-board and said feed gate, a pulverizing roller mounted above said feed roller, means for simultaneously rotating said feed roller and said pulverizing roller, and means operated by said feed roller shaft for intermittently vibrating said box, substantially as described.

2. Means for pulverizing and distributing fine granular material, comprising a hopper, a box mounted below said hopper, and provided with an adjustable cant-board and an adjustable feed gate, a feed roller mounted beneath said cant-board and said feed gate, a pulverizing roller mounted above said feed roller, means for simultaneously rotating said feed roller and said pulverizing roller, and means operated by said feed roller shaft for intermittently vibrating said box, substantially as described.

3. Means for pulverizing and distributing fine granular material, comprising a hopper, a box mounted below said hopper, and provided with an adjustable cant-board and an adjustable feed gate, a grooved and fluted feed roller mounted beneath said cant-board and said feed gate, a grooved and fluted pulverizing roller mounted above said feed roller, means for simultaneously rotating said feed roller and said pulverizing roller, and means operated by said feed roller shaft for intermittently vibrating said box, substantially as described.

4. Means for pulverizing and distributing fine granular material, comprising a hopper, a box mounted below said hopper, and provided with an adjustable cant-board and a hinged feed gate, a hand wheel and screw for adjusting the position of said feed gate, a feed roller mounted beneath said cant-board and said feed gate, a pulverizing roller mounted above said feed roller, means for simultaneously rotating said feed roller and said pulverizing roller, and means operated by said feed roller shaft for intermittently vibrating said box, substantially as described.

5. An apparatus of the character described, comprising a conveyer and means for driving same, a hopper and a box below same both mounted above said conveyer and connected therewith, a pulverizing roller and a feed roller both journaled in said box, gearing connecting said feed roller and said pulverizing roller with said conveyer whereby both are driven at a speed proportional to the speed of said conveyer, with means for varying the supply of powdered material delivered by said feed roller to said conveyer, and means operated by the conveyer shaft for intermittently vibrating said hopper and box, substantially as described.

6. An apparatus of the character described, comprising a screw conveyer adapted to convey granular material from one point to another, a conveyer shaft, and means for driving said shaft, a box mounted above said conveyer and connected therewith, the said box being intermediate to the ends of said conveyer, a feed roller shaft journaled in said box, a feed roller mounted thereon, means for supplying powdered material to said feed roller, gearing connecting said feed roller shaft with said conveyer shaft whereby said feed roller is driven at a speed proportional to the speed of said conveyer, with means for varying the supply of powdered material delivered by said feed roller to said conveyer, and means operated by said conveyer shaft for intermittently vibrating said box, substantially as described.

In testimony whereof, I have affixed my signature.

FORREST C. HOLLY.